(12) United States Patent
Wilhelmi et al.

(10) Patent No.: US 7,938,072 B2
(45) Date of Patent: May 10, 2011

(54) AIR PRESSURE DISSIPATOR FOR AIR SEED DELIVERY SYSTEM

(75) Inventors: Matthew Wilhelmi, Parnell, IA (US); Kenneth Shoup, Bonfield, IL (US); Daniel Koop, Parnell, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 0 days.

(21) Appl. No.: 12/561,655

(22) Filed: Sep. 17, 2009

(65) Prior Publication Data

US 2011/0000409 A1 Jan. 6, 2011

Related U.S. Application Data

(60) Provisional application No. 61/222,335, filed on Jul. 1, 2009.

(51) Int. Cl.
*A01C 7/00* (2006.01)
*A01C 9/00* (2006.01)
(52) U.S. Cl. ........................................................ 111/174
(58) Field of Classification Search .................. 111/170, 111/174, 177, 178, 185
See application file for complete search history.

(56) References Cited

U.S. PATENT DOCUMENTS

| 5,392,722 A | * | 2/1995 | Snipes et al. ................. 111/174 |
| 5,915,312 A | * | 6/1999 | Meyer et al. ................. 111/174 |

* cited by examiner

*Primary Examiner* — Christopher J. Novosad
(74) *Attorney, Agent, or Firm* — Thomas E. Hill; Wildman, Harrold, Allen & Dixon LLP

(57) ABSTRACT

In an air pressurized system for use in delivering seeds in an agricultural planter from a main hopper to plural remote bins each associated with a respective seed discharge unit, an air/seed mixture is provided to a seed discharge unit via an air pressure dissipator which vents the air to the atmosphere in controlling the rate at which seed is delivered to the seed discharge unit. The air pressure dissipator includes an upper, angled tube having an outwardly tapered lower end adapted to receive an upper end of a perforated screen tube which extends into the seed discharge unit. As the seed discharge unit fills with seed during operation, the air pressure dissipator regulates the air flow entraining and transporting the seed by directing a portion of the air to the atmosphere when necessary to provide seed to the seed discharge unit to substantially match the seed discharge rate.

22 Claims, 7 Drawing Sheets

AIR PRESSURE DISSIPATOR FOR AIR SEED DELIVERY SYSTEM

FIELD OF THE INVENTION

This invention relates generally to pressurized air systems for delivering seeds from a main hopper to one or more remote bins each associated with a planter row unit, and is particularly directed to an air pressure dissipator for regulating the flow of air and the amount of seed delivered to a planter row unit.

BACKGROUND OF THE INVENTION

Early agricultural planters for simultaneously planting plural spaced rows of crops using seed metering apparatus for dispensing seeds at a controlled rate provided each seed metering unit with its own seed hopper. The limited space available along the length of the planter's tool bar restricted the size of the individual row unit hoppers and led to the use of a central seed hopper for supplying plural smaller remote hoppers, or bins, each associated with a respective row unit. Plural hoses, or tubes, connect the central seed hopper to each remote bin of an individual seed metering unit. The seed bin of a seed metering device is typically integrated in the housing of the seed meter.

Air under pressure is used to move the seeds from the central seed hopper via the aforementioned tubes extending to the individual remote seed meters. Seeds in the main hopper are agitated by and entrained within an air stream and are delivered under pressure to the individual seed meters. In this type of distribution system, it is difficult to provide uniform seed agitation and transport via airstream entrainment to all individual remote seed meters to ensure uniform seed deposit in all of the crop rows. Inline air current which is too low will result in a reduced number of seeds being transported to the seed meters, while too high an air current may result in excess seed accumulation causing more than one seed to be discharged at a given time or interruptions in seed flow preventing deposit of seeds at regular intervals. Attempts to address this problem have led to the introduction of large remote hoppers having sufficient seed capacity to compensate for any reduction or interruption in the flow of seeds to any of the remote seed meters. But this approach has met with only limited success because of the limited space on the toolbar and the close spacings of the crop rows as discussed above.

The present invention addresses the aforementioned limitations of the prior art by providing a means of variable air dissipation in a compressed air system for distributing seeds from one or more central hoppers to plural remote seed meters for timed deposit of individual seeds in the soil.

DETAILED DESCRIPTION OF THE PREFERRED EMBODIMENTS

Figure 1:
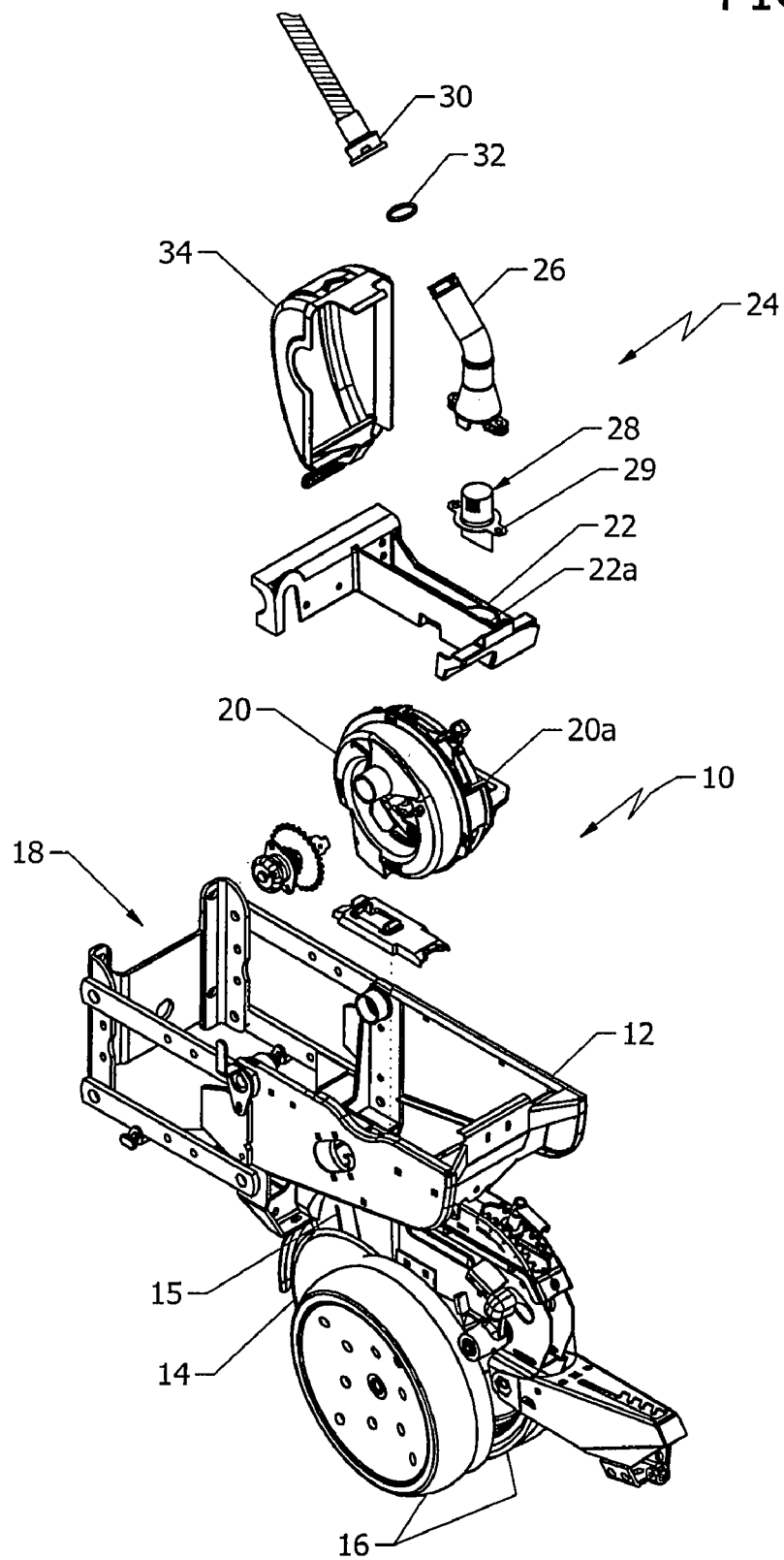
FIG. 1 is an exploded perspective view of a planter row unit incorporating an air pressure dissipater for an air seed delivery system in accordance with the present invention.

Referring to FIG. 1, there is shown an exploded perspective view of an agricultural planter unit 10 connected to an air seed delivery system incorporating an air pressure dissipater 24 in accordance with the principles of the present invention. While the inventive air pressure dissipater 24 is described herein for use in a seed delivery system, this invention is not limited to one particular embodiment or to that type of environment and has application in virtually any particle, or particulate matter, delivery system using an airstream, or air (or other type of gas) under pressure, to move the particles.

Planter row unit 10 includes a support frame 12 having attached to a lower portion thereof plural ground engaging tools 14 (only one of which is shown for simplicity) and wheels 16. Also coupled to a lower portion of support frame 12 is an attachment mechanism 18 for connecting the planter row unit 10 to a toolbar (not shown) of an agricultural planter. Plural planter row units 10 are disposed in a spaced manner along the length of the toolbar. Disposed on and mounted to support frame 12 is a seed meter 20 which dispenses seeds in a timed manner as determined by the speed of the planter row unit 10 traversing a field. A lower portion of seed meter 20 is connected to a seed discharge tube 15 for discharging the seeds into a furrow formed by the aforementioned ground engaging tools 14. The seed meter 20 shown in FIG. 1 is of the vacuum type and includes an opening 20a to a seed reservoir within the seed meter. Attached to an upper portion of support frame 12 as well as to seed meter 20 is a seed meter mount 22 having an aperture 22a aligned with the aperture 20a in the seed meter. While the present invention is described herein as used in combination with a vacuum type seed meter, this invention could equally as well be used with a positive air pressure seed meter or a mechanical seed meter.

Figure 2:
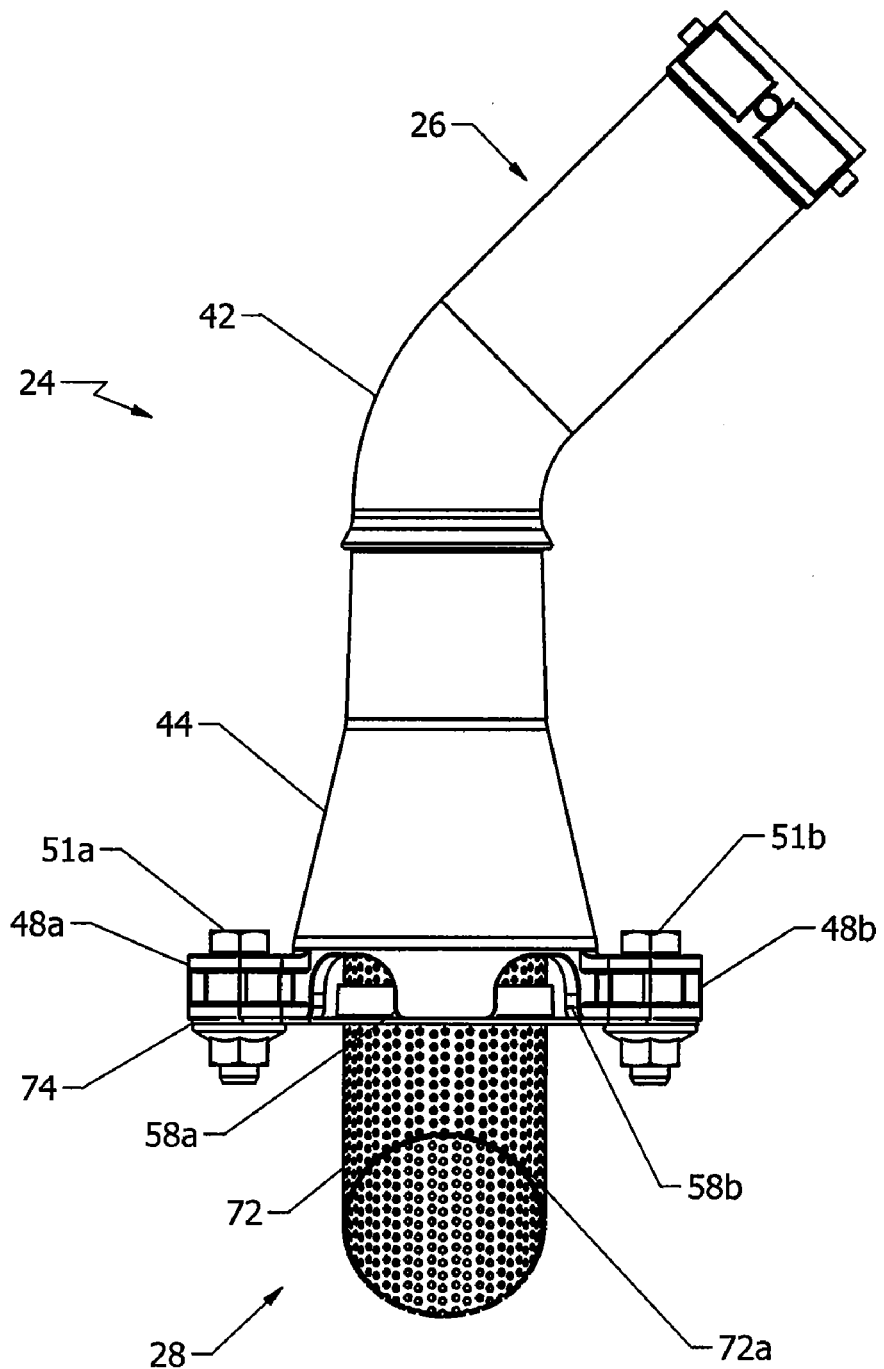
FIG. 2 is a side elevation view of the inventive air pressure dissipater.
Figure 3:
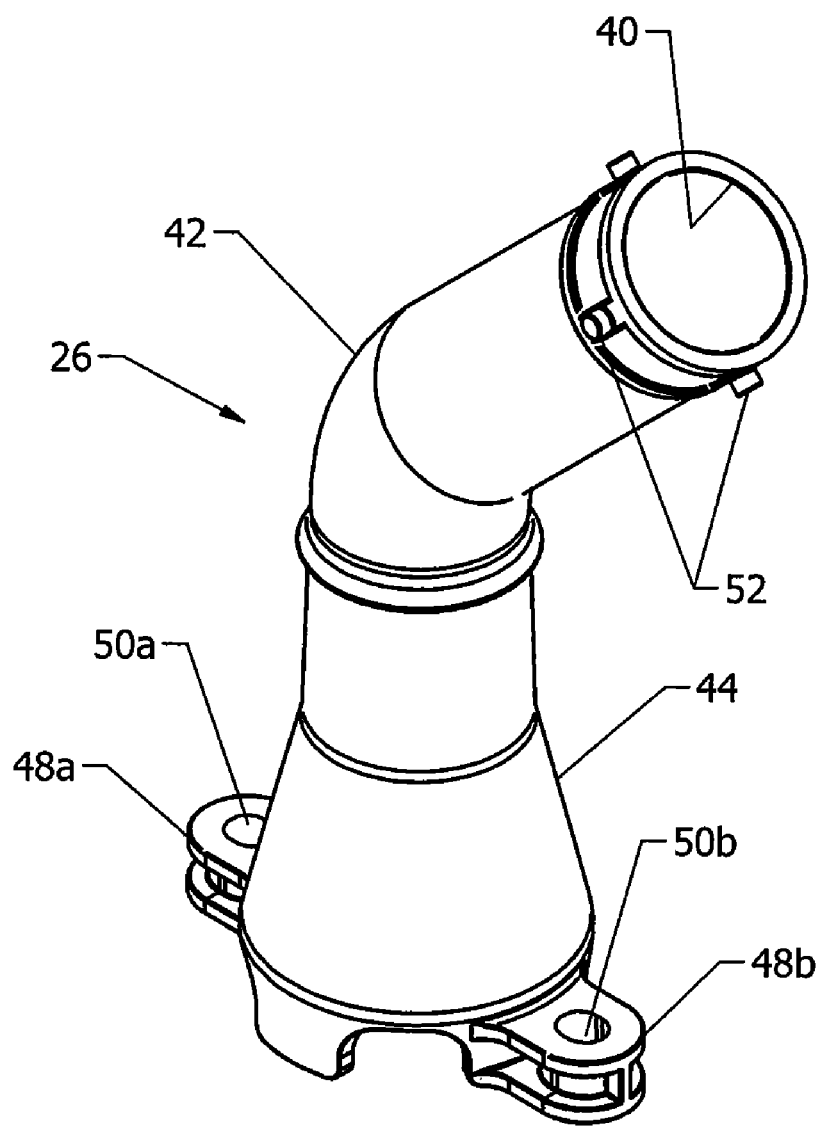
FIG. 3 is an upper perspective view of an air dissipator tube incorporated in the air pressure dissipator of the present invention.
Figure 4:
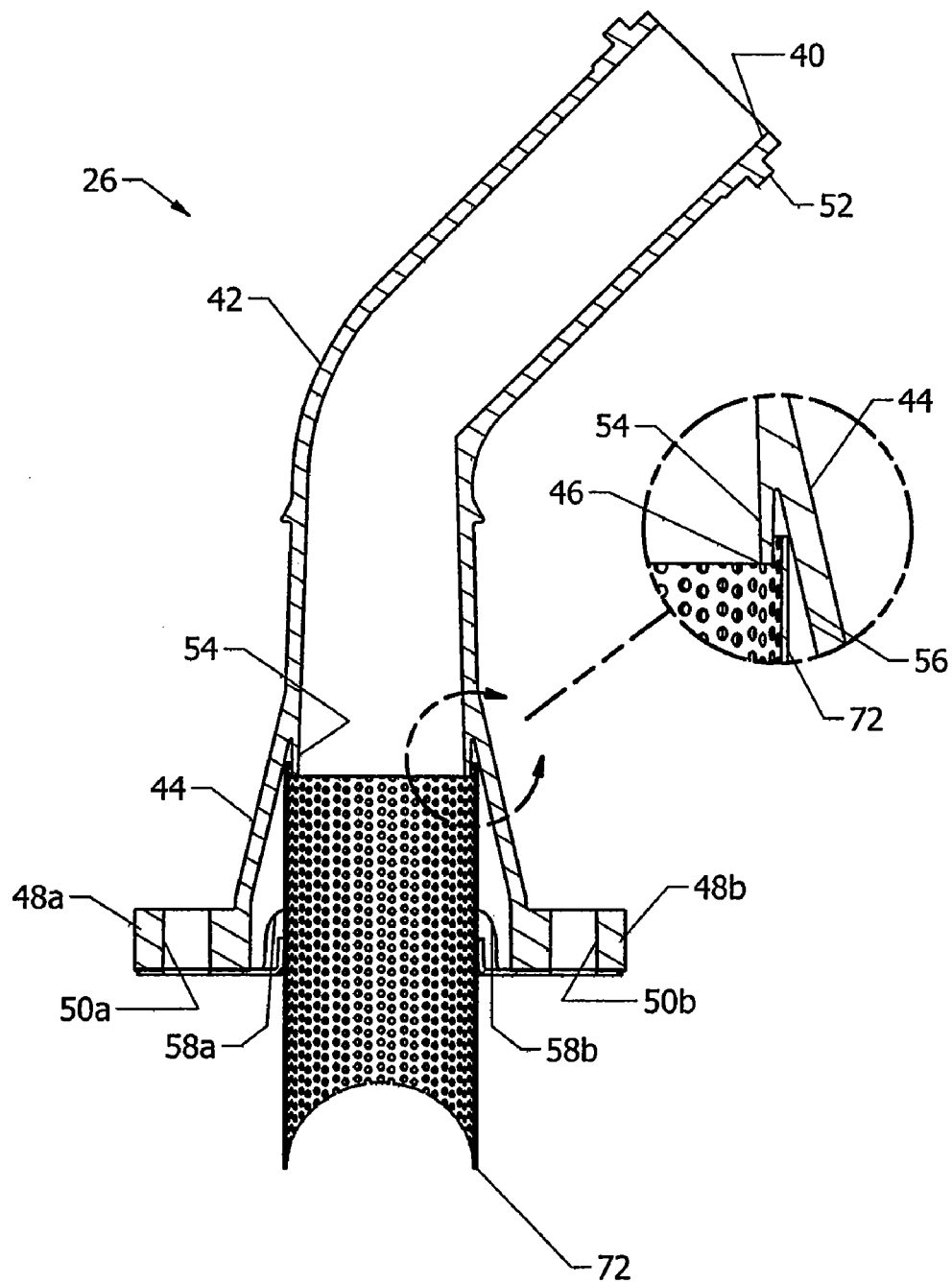
FIG. 4 is a longitudinal sectional view of the air dissipator tube shown in FIG. 2, with a portion shown in enlarged detail.
Figure 5:
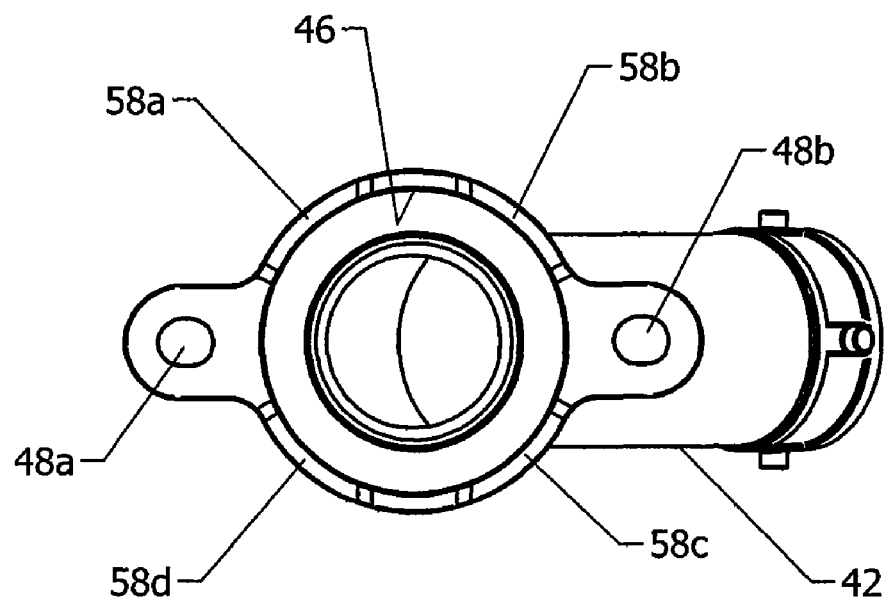
FIG. 5 is a bottom plan view of the air dissipator tube shown in FIG. 2, with a portion thereof shown in enlarged detail.
Figure 6:
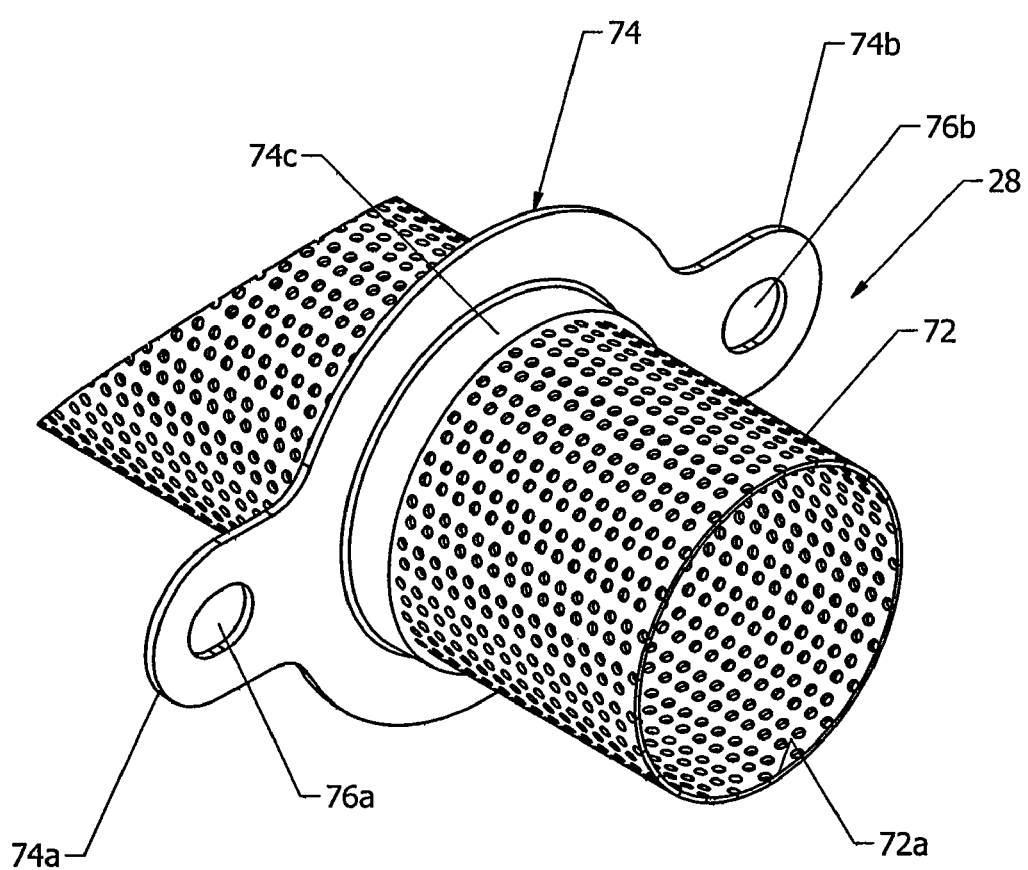
FIG. 6 is a perspective view of a perforated tube assembly used in the air pressure dissipator of the present invention.
Figure 7:
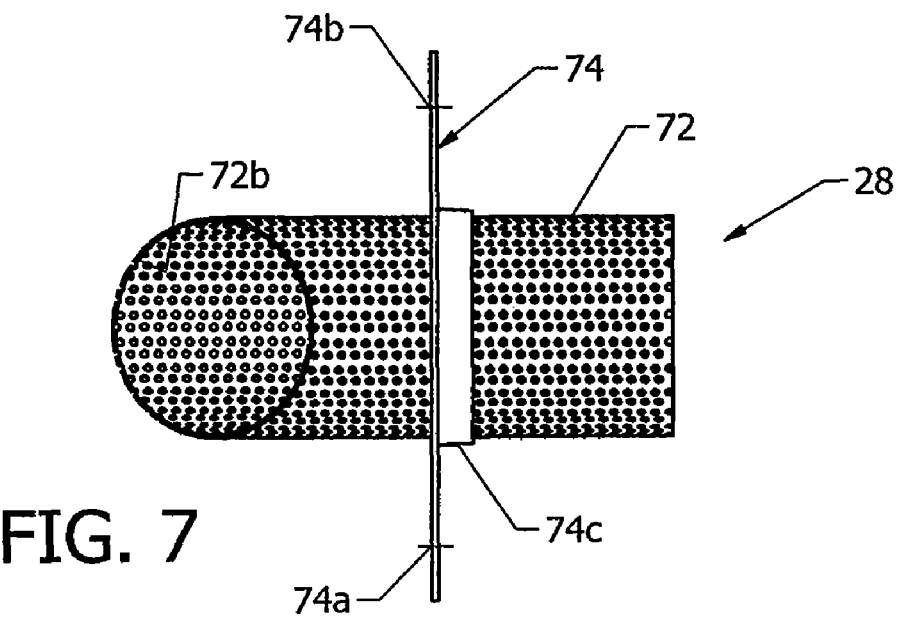
FIGS. 7 and 8 are side elevation views illustrating additional details of the perforated tube assembly shown in FIG. 6.
Figure 8:
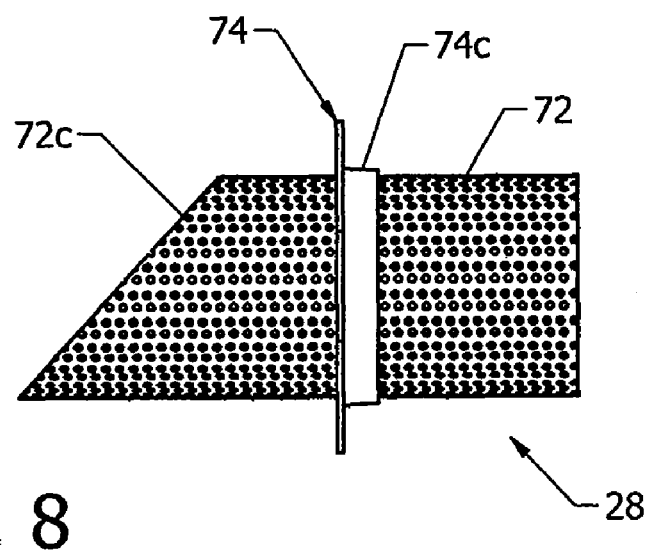

Attached to an upper portion of seed meter mount 22 and aligned with the aperture 22a therein is an air pressure dissipator 24 in accordance with the present invention. A side elevation view of the inventive air pressure dissipator 24 is shown in FIG. 2. Air pressure dissipator 24 includes an upper air dissipator tube 26 or dissipater chamber and a lower air dissipator screen 28. FIG. 3 is an upper perspective view of the air dissipator tube 26. FIGS. 4 and 5 are respectively longitudinal sectional and bottom plan views of the air dissipator tube 26, with each of these figures including enlarged portions of the air dissipator tube to illustrate additional details thereof. FIGS. 6, 7 and 8 are respectively perspective and side elevation views of the air dissipater screen 28 of the inventive air pressure dissipater 24.

The air dissipator tube 26 of the air pressure dissipator 24 is preferably comprised of a high strength plastic and includes an upper angled portion 42 having an aperture 40 in the upper end thereof and a lower outwardly tapered portion 44 having a lower aperture 46 therein. The upper end of the angled portion 42 of the air dissipater tube 26 is adapted for coupling by means of plural spaced projections 52 on the outer surface thereof to a connector 30. Connector 30 is adapted for coupling to a seed hopper by means of an elongated tube, which are not shown in the figures for simplicity. It is in this manner that seeds are provided from the hopper via the air pressure dissipater tube 26 to the seed meter 20 for deposit in the soil. A gasket 32 is provided between the upper end of air dissipator tube 26 and connector 30 for providing an airtight, sealed connection therebetween. The angle in the air pressure dissipator tube 26 is selected so as to facilitate seed/air flow through the air pressure dissipator 24 and to facilitate connection of the air pressure dissipator to a planter row unit disposed either forward or aft of the planter's tool bar by mounting the air pressure dissipator so as to extend either in a forward or an aft direction relative to the toolbar to accommodate the position of the planter row unit. In a preferred embodiment, the angle of the air pressure dissipater tube 26 is on the order of 45° to facilitate coupling the air pressure dissipater tube to a seed hopper typically via the combination of a flexible hose and a seed air entrainment device which are not shown for simplicity. While the present invention is described herein as being mounted to the top of the seed meter hopper and bent 45 degrees to accommodate hose attachment, this invention could work equally as well with other configurations, combinations and arrangements of its [principle] components.

Extending downward from the angled portion 42 is the outwardly tapered portion 44 of the air dissipator tube 26. Disposed on outer, opposed portions of the outwardly tapered portion 44 of the air pressure dissipator tube 26 are first and second mounting flanges 48a and 48b. Each of the first and second mounting flanges 48a, 48b includes a respective aperture 50a and 50b therein. Each of apertures 50a, 50b is adapted to receive a respective connector 51a, 51b as shown in FIG. 2 for securely connecting air dissipator screen 28 to a lower end of air dissipator tube 26. In FIG. 2, first and second connectors 51a, 51b are shown as nut and bolt combinations, although various conventional types of coupling arrangements could be used to connect air dissipator tube 26 and air dissipator screen 28. First and second connectors 51a, 51b may also be used to connect air pressure dissipator 24 to seed meter mount 22 such that air dissipator screen 28 is disposed within the seed meter mount's aperture 22a aligned with aperture 20a in seed meter 20. Also disposed on the lower end of the outwardly tapered portion 44 of air dissipator tube 26 are plural spaced recesses 58a-58d, where two of these recesses 58a and 58b are shown in FIGS. 2 and 4 and all four are identified in FIG. 5. In addition, disposed about the inner surface of the air pressure dissipator 24 where its angled portion 42 meets its outwardly tapered portion 44 is a circular lip extension 54 extending in a downward direction as shown in the sectional view of FIG. 4.

The air dissipator screen 28 attached to the lower end of the air dissipater tube 26 includes an elongated, linear perforated tube 72 preferably comprised of a non-corrosive metal, plastic or other suitable material. Perforated tube has an upper opening 72a and a lower opening 72b in its tapered lower end 72c. Disposed about and attached to perforated tube 72 is a mounting plate 74. Mounting plate 74 includes first and second opposed mounting flanges 74a and 74b each having a respective aperture 76a and 76b therein. Mounting flanges 74a, 74b and apertures 76a, 76b are aligned with the mounting flanges 48a, 48b and apertures 50a, 50b in air pressure dissipator tube 26 for connecting these two components together by means of the aforementioned first and second connectors 51a and 51b. Formed integrally with mounting plate 74 and extending about the large aperture in the mounting plate is an upraised lip portion 74c which is crimped, bonded, welded otherwise attached to the outer surface of perforated tube 72 to securely connect these two components in a fixed manner. The openings along the length of perforated tube 72 allow air to pass through the tube, while maintaining seed entrained in the air flow from the main seed hopper confined within the air pressure dissipator 24 for delivery to seed meter 20.

While the lower tapered end 72c of the air pressure dissipator's perforated tube 72 is disposed within the seed reservoir in seed meter 20, the upper end of the perforated tube extends into the outwardly tapered portion 44 in the lower end of the air dissipator tube 26. The upper end of the perforated tube 72 defining aperture 72a therein is inserted in an annular slot 56 disposed between the above described inner lip extension 54 on the inner surface of air dissipator tube 26 and its outwardly tapered portion 44 as shown in FIG. 4. Contact is established between the upper edge of the perforated tube 72, the inner surface of the outwardly tapered portion 44 and inner lip extension 54 of air dissipater tube 26 to ensure that none of the seeds escape the air delivery system and are directed through the perforated tube. As additional seed is deposited in the seed reservoir of seed meter 20, the seed level approaches the lower end of the air pressure dissipator's perforated tube 72. As the deposited seed fills the lower end of perforated tube 72 in an increasing manner, an increase in blockage of the openings in the perforated tube results thereby decreasing the amount of air that is discharged through the perforations in the tube, as well as through the plural recesses 58a-58d in the lower edge of the air dissipater tube's outwardly tapered portion 44. This decrease in air discharged from a lateral portion of air pressure dissipater 24 reduces the air flow velocity in the seed delivery hose, thus preventing seeds from being entrained into the airstream and delivered to the seed meter until the seed level in the perforated tube 72 is lowered to permit additional air and seed to flow into the seed meter. Thus, as seeds are discharged to the soil, the seed level in the seed meter 20 drops allowing an increase in the air flow being dissipated to the atmosphere which in turn increases the air current in the seed delivery hose allowing additional seed to be entrained into the air stream and delivered to the seed meter for discharge onto the soil. It is in this manner that the inventive air pressure dissipator 24 operates to maintain the seed level in seed meter 20 at a more or less constant level to prevent the deposit of excessive amounts of seed in the seed meter, while ensuring a steady flow of seed to the seed meter for optimum seed discharge. While the present invention is described herein as having a straight perforated tube 72 used in conjunction with an outwardly tapered and angled dissipater tube 26, other tube and screen shapes and combinations thereof could equally as well be used to create a variable air discharge area thereby controlling air current-dependent seed entrainment as seed levels rise and fall.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A particulate matter transport and discharge arrangement comprising:
    a reservoir containing particulate matter and having a discharge tube attached thereto, wherein air under pressure is provided to said reservoir for entraining the particulate matter in an air stream for removing the particulate matter from said reservoir via said discharge tube;

a hollow elongated member having a lateral wall, with at least a portion of the lateral wall of said hollow elongated member having plural apertures disposed in a spaced manner about the circumference thereof, said hollow elongated member further including a first open end coupled in a sealed manner to said discharge tube for receiving air-stream entrained particulate matter from said reservoir, and a second opposed open end; and a discharge mechanism coupled to the second open end of said hollow elongated member for receiving and discharging the particulate material;

wherein said hollow elongated member regulates the flow of particulate matter to said discharge mechanism by controlling air flow to said discharge mechanism to prevent over feeding of said discharge mechanism of the particulate matter.

2. The arrangement of claim 1, wherein the particulate matter is seed, fertilizer or a herbicide.

3. The arrangement of claim 1, wherein the particulate matter is seed and the arrangement is used in an air seed delivery system.

4. The arrangement of claim 3, wherein said discharge mechanism is a seed meter.

5. The arrangement of claim 1, wherein said hollow elongated member is in the form of a tube.

6. The arrangement of claim 5, wherein said hollow elongated member includes an upper air tube in pneumatic communication with said reservoir and a lower apertured tubular screen coupled to said discharge mechanism, and wherein said upper air tube is connected to said lower apertured tubular screen in a semi-sealed manner.

7. The arrangement of claim 6, wherein said upper air tube includes an outwardly tapered lower end portion adapted for semi-sealed connection to said lower apertured tubular screen, wherein said lower end portion of said upper air tube is outwardly tapered in the direction of particulate matter flow.

8. The arrangement of claim 7, wherein said upper air tube further includes an inner lip extension disposed in a spaced manner inwardly from said outwardly tapered lower end portion, and wherein said lower apertured tubular screen includes an upper edge portion disposed between and engaging the outwardly tapered lower portion and the inner lip extension of said upper air tube.

9. The arrangement of claim 6, wherein said upper air tube includes a 45° bend and said tubular screen is linear in configuration.

10. The arrangement of claim 6, wherein said tubular screen includes an angled lower end portion forming a terminal portion of said elongated hollow member.

11. The arrangement of claim 6, wherein an upper end portion of said lower apertured tubular screen extends up into and is inwardly displaced from an adjacent lower end portion of said upper air tube.

12. A particulate matter transport and discharge arrangement comprising:

a reservoir containing particulate matter and having a discharge tube attached thereto, wherein air under pressure is provided to said reservoir for entraining the particulate matter in an air stream for removing the particulate matter from said reservoir via said discharge tube;

a hollow elongated member having a lateral wall, with at least a portion of the lateral wall of said hollow elongated member having plural apertures disposed in a spaced manner about the circumference thereof, said hollow elongated member further including a first open end coupled in a sealed manner to said discharge tube for receiving air-stream entrained particulate matter from said reservoir, and a second opposed open end; and a discharge mechanism coupled to the second open end of said hollow elongated member for receiving and discharging the particulate material;

wherein said hollow elongated member regulates the flow of particulate matter to said discharge mechanism by controlling air flow to said discharge mechanism to prevent over feeding of said discharge mechanism of the particulate matter, and wherein said hollow elongated member is in the form of a tube and includes an upper air tube in pneumatic communication with said reservoir and a lower apertured tubular screen coupled to said discharge mechanism, and wherein said upper air tube is connected to said lower apertured tubular screen in a semi-sealed manner, and wherein said upper air tube includes an outwardly tapered lower end portion adapted for semi-sealed connection to said lower apertured tubular screen, wherein said upper air tube further includes an inner lip extension disposed in a spaced manner inwardly from said outwardly tapered lower end portion, and wherein said lower apertured tubular screen includes an upper edge portion disposed between and engaging the outwardly tapered lower portion and the inner lip extension of said upper air tube, and wherein said upper air tube and said lower apertured tubular screen respectively include first and second coupling flanges for connecting said upper air tube and said lower apertured tubular screen together.

13. The arrangement of claim 12, further comprising a plurality of mated sets of air tubes and tubular screens to facilitate multiple distribution points from a single central reservoir.

14. The arrangement of claim 13, wherein said plural connectors are nut and bolt combinations.

15. The arrangement of claim 14, wherein said first and second coupling flanges and said plural connectors are adapted for attaching said hollow elongated member to a support structure.

16. The arrangement of claim 15, wherein a lower end portion of said upper air tube includes one or more openings for facilitating air flow through the apertures in said tubular screen in controlling air flow to said discharge mechanism.

17. The arrangement of claim 12, wherein said first and second coupling flanges are symmetrically disposed on each of said upper air tube and said lower apertured tubular screen.

18. A particulate matter transport and discharge arrangement comprising:

a reservoir containing particulate matter and having a discharge tube attached thereto, wherein air under pressure is provided to said reservoir for entraining the particulate matter in an air stream for removing the particulate matter from said reservoir via said discharge tube;

a hollow elongated member having a lateral wall, with at least a portion of the lateral wall of said hollow elongated member having plural apertures disposed in a spaced manner about the circumference thereof, said hollow elongated member further including a first open end coupled in a sealed manner to said discharge tube for receiving air-stream entrained particulate matter from said reservoir, and a second opposed open end; and a discharge mechanism coupled to the second open end of said hollow elongated member for receiving and discharging the particulate material;

wherein said hollow elongated member regulates the flow of particulate matter to said discharge mechanism by controlling air flow to said discharge mechanism to prevent over feeding of said discharge mechanism of the particulate matter, wherein said hollow elongated member is in the form of a tube and includes an upper air tube in pneumatic communication with said reservoir and a lower apertured tubular screen coupled to said discharge mechanism, and wherein said upper air tube is connected to said lower apertured tubular screen in a semi-sealed manner, and wherein said upper air tube includes an outwardly tapered lower end portion adapted for semi-sealed connection to said lower apertured tubular screen, wherein said upper air tube further includes an inner lip extension disposed in a spaced manner inwardly from said outwardly tapered lower end portion, and wherein said lower apertured tubular screen includes an upper edge portion disposed between and engaging the outwardly tapered lower portion and the inner lip extension of said upper air tube, and wherein said upper air tube and said lower apertured tubular screen respectively include first and second coupling flanges for connecting said upper air tube and said lower apertured tubular screen together, and wherein said second coupling flange is disposed on an intermediate portion of said lower apertured tubular screen, with said lower apertured screen extending above and below a lower end of said upper air tube.

19. In a system wherein particulate material is removed from a reservoir by entraining the particulate material in an air stream, apparatus for providing said particulate matter to a distributor of the particulate matter, wherein said distributor discharges the particulate material at a varying rate depending upon operating conditions, said apparatus comprising:

a first tube having first and second opposed open ends, wherein said first end is connected in a sealed manner via a conduit to the reservoir for receiving the air-stream entrained particulate matter;

a second tube having third and fourth opposed open ends, wherein said fourth end is connected in a semi-sealed manner to the particulate matter distributor; and a hollow elongated member having a lateral wall with plural apertures disposed in a spaced manner about the circumference thereof and first and second open end portions respectively connected in a sealed manner to the second open end of said first tube and to the third open end of said second tube, wherein particulate material entrained in the air stream is provided via said hollow elongated member to the distributor, and when the particulate material fills the distributor and at least partially fills said hollow member, reduced air flow passes through the apertures of said hollow member resulting in a reduction, interruption or stoppage in the particulate material being provided to the distributor and preventing over-feeding of the system.

20. A particulate matter transport and discharge arrangement comprising:

a reservoir containing particulate matter and having a discharge tube attached thereto, wherein air under pressure is provided to said reservoir for entraining the particulate matter in an air stream for removing the particulate matter from said reservoir via a conduit to said discharge tube;

a hollow elongated member having a lateral wall, with at least a portion of the lateral wall of said hollow elongated member having plural apertures disposed in a spaced manner about the circumference thereof, said hollow elongated member further including a first open end coupled in a sealed manner to said discharge tube for receiving air-stream entrained particulate matter from said reservoir, and a second opposed open end; and a discharge mechanism coupled to the second open end of said hollow elongated member for receiving and discharging the particulate material;

wherein said hollow elongated member regulates the flow of particulate matter to said discharge mechanism by controlling air flow to said discharge mechanism to prevent inadequate seed accumulation or excess seed accumulation of particulate matter in said discharge mechanism.

21. A particulate matter transport and discharge arrangement comprising:

a reservoir containing particulate matter and having a discharge tube attached thereto, wherein air under pressure is provided to said reservoir for entraining the particulate matter in an air stream for removing the particulate matter from said reservoir via said discharge tube;

a hollow elongated member having a lateral wall, with at least a portion of the lateral wall of said hollow elongated member having plural apertures disposed in a spaced manner about the circumference thereof, said hollow elongated member further including a first open end coupled in a sealed manner to said discharge tube for receiving air-stream entrained particulate matter from said reservoir, and a second opposed open end; and a discharge mechanism coupled to the second open end of said hollow elongated member for receiving and discharging the particulate material;

wherein said hollow elongated member regulates the flow of particulate matter to said discharge mechanism by controlling air flow to said discharge mechanism to provide uniform seed agitation and transport to said discharge mechanism for uniform seed deposit.

22. A particulate matter transport and discharge arrangement comprising:

plural reservoirs each containing particulate matter and each having a respective discharge tube attached thereto, wherein air under pressure is provided to said reservoirs for entraining the particulate matter in an air stream for removing the particulate matter from said reservoirs via said discharge tubes;

plural hollow elongated members each having a respective lateral wall, with at least a portion of each lateral wall of each of said hollow elongated members having plural apertures disposed in a spaced manner about the circumference thereof, each of said hollow elongated members further including a first open end coupled to a discharge tube for receiving air-stream entrained particulate matter from a respective reservoir, and a second opposed open end; and plural discharge mechanisms each coupled to the second open end of a respective hollow elongated member for receiving and discharging the particulate material;

wherein said hollow elongated members regulate the flow of particulate matter to said discharge mechanisms by controlling air flow to said discharge mechanisms to provide uniform seed agitation and transport to each of said discharge mechanisms for uniform seed deposit.

* * * * *